(12) United States Patent
Connah et al.

(10) Patent No.: US 8,682,093 B2
(45) Date of Patent: Mar. 25, 2014

(54) METHOD AND SYSTEM FOR GENERATING ACCENTED IMAGE DATA

(75) Inventors: David Connah, York (GB); Mark S. Drew, West Vancouver (CA); Graham Finlayson, Taverham (GB)

(73) Assignee: University of East Anglia (GB)

( * ) Notice: Subject to any disclaimer, the term of this patent is extended or adjusted under 35 U.S.C. 154(b) by 710 days.

(21) Appl. No.: 12/870,056

(22) Filed: Aug. 27, 2010

(65) Prior Publication Data

US 2011/0052029 A1    Mar. 3, 2011

Related U.S. Application Data

(60) Provisional application No. 61/244,606, filed on Sep. 22, 2009.

(30) Foreign Application Priority Data

Aug. 27, 2009   (GB) .................. 0914982.4

(51) Int. Cl.
| | |
|---|---|
| G06K 9/46 | (2006.01) |
| G06K 9/62 | (2006.01) |
| G06K 9/66 | (2006.01) |
| G06K 9/40 | (2006.01) |
| H04N 7/18 | (2006.01) |

(52) U.S. Cl.
USPC ........... 382/266; 382/161; 382/191; 382/254; 348/61; 348/143

(58) Field of Classification Search
USPC ............. 382/128, 153–154, 162, 195, 232, 382/254–255, 266–269, 274–275, 276, 280, 382/282, 284; 348/61, 79–80, 113, 348/143–160, 207.99, 207.1, 207.2; 358/1.1–1.2, 1.9; 347/1, 5–20
See application file for complete search history.

(56) References Cited

U.S. PATENT DOCUMENTS

| | | | |
|---|---|---|---|
| 6,539,126 | B1 | 3/2003 | Socolinsky et al. |
| 2004/0184667 | A1 | 9/2004 | Raskar et al. |
| 2005/0207641 | A1 | 9/2005 | Bala et al. |
| 2006/0002634 | A1* | 1/2006 | Riley et al. ............ 382/294 |
| 2008/0080787 | A1 | 4/2008 | Yang et al. |

(Continued)

OTHER PUBLICATIONS

Alsam, "Contrast Enhancing Colour to Grey", Proceeding SCIA '09 Proceedings of the 16th Scandinavian Conference on Image Analysis, pp. 588-596, Springer-Verlag Berlin, Heidelberg, Jun. 2009.*

(Continued)

*Primary Examiner* — Randolph I Chu
*Assistant Examiner* — Nathan Bloom
(74) *Attorney, Agent, or Firm* — Craig A. Fieschko, Esq.; DeWitt Ross & Stevens S.C.

(57) ABSTRACT

A method and system for producing accented image data for an accented image is disclosed. The method includes decomposing each of a first and a second image into a gradient representation which comprises spectral and edge components. The first image comprises more spectral dimensions than the second image. The edge component from the first image is combined with the spectral component from the second image to form a combined gradient representation. Accented image data for the accented image is then generated from data including the combined gradient representation.

20 Claims, 15 Drawing Sheets

(56) References Cited

U.S. PATENT DOCUMENTS

2009/0296110 A1* 12/2009 Mestha et al. ............... 358/1.9
2010/0284626 A1* 11/2010 Malm et al. .................. 382/261
2012/0114226 A1* 5/2012 Kameyama ................. 382/155

OTHER PUBLICATIONS

Mark S. Drew ; David Connah ; Graham D. Finlayson ; Marina Bloj; Improved colour to greyscale via integrability correction. Proc. SPIE 7240, Human Vision and Electronic Imaging XIV, 72401B (Feb. 10, 2009);.*
Thomason, Michael, and Jens Gregor. Fusion of Multiple Images by Higher-Order SVD of Third-Order Image Tensors. Technical Report, EECS Dept, Univ. of Tennessee, 2007.*
Alsam, Ali, and Mark S. Drew. "Fast colour2grey." 16th Color Imaging Conf. 2008.*
Connah, David, Graham Finlayson, and Marina Bloj. "Coding contrast as brightness to convert colour images to grey-scale." Perception 36 (2007): 303-303, Jun. 30 2007.*
Agrawal et al., "An algebraic approach to surface reconstruction from gradient fields," in *Int. Conf. on Computer Vision*, pp. I: 174-181, 2005.
Brettel et al., "Computerized simulation of color appearance for dichromats," *J. Opt. Soc. Am. A* 14, pp. 2647-2655, 1997.
Connah et al., "Seeing Beyond Luminance: A Psychophysical Comparison of Techniques for Converting Colour Images to Greyscale", *Proceedings of the Color Imaging Conference: Color Science, Systems and Applications*, 15$^{th}$ Conf., Nov. 5, 2007, pp. 336-341.
Di Zenzo, "A note on the gradient of a multi-image," *Computer Vision, Graphics, and ImageProcessing* 33, pp. 116-125, Jan. 1986.
Drew et al., "Realistic colorization via the structure tensor," in *Int. Conf. on ImageProcessing: ICIP08*, (San Diego, CA), 2008.
Drew et al., "Visualizing diffusion tensor dissimilarity using an ica based perceptual color metric," in *15$^{th}$ Color Imaging Conference: Color, Science, Systems and Applications, Society for Imaging Science & Technology (IS&T)/Society for Information Display (SID) joint conference*, 2007.
Frankot et al., "A method for enforcing integrability in shape from shading algorithms," *IEEE Transactions on Pattern Analysis and Machine Intelligence* 10, pp. 439-451, 1988.
Fredembach et al., "Colouring the near infrared", *Proceedings of the IS&T/SID 16$^{th}$ Color Imaging Conference*, pp. 176-182, 2008.
Golub et al., Matrix Computations, *John Hopkins U. Press*, p. 601, 1983.
Jacobson et al., "Linear fusion of image sets for display," *IEEE Trans. On Geosciences and Remote Sensing* 45, pp. 3277-3288, 2007.
Rasche et al., "Detail preserving reproduction of color images for monochro-mats and dichromats.," *IEEE Computer Graphics and Applications* 25, pp. 22-30, May 2005.
Sapiro et al., "Anisotropic diffusion of multivalued images with applications to color filtering," *IEEE Trans. Im. Proc.* 15, pp. 1582-1586, 1996.
Socolinsky et al., "A new visualization paradigm for multispectral imagery and data fusion," in *CVPR*, pp. I:319-324, 1999.
Socolinsky et al., "Multispectral image visualization through first-order fusion.," *IEEE Transactions on Image Processing* 11(8), pp. 923-931, 2002.
Tikhonov et al., Solutions of ill-posed problems, *Wiley*, pp. 95-108, 1977.
Tyo et al., "Principal-components-based display strategy for spectral imagery," *IEEE Trans. on Geosciences and Remote Sensing* 41(3), pp. 708-718, 2003.
Vi'Enot et al., "Digital video colourmaps for checking the legibility of displays by dichromats," *Color Research and Application* 24, pp. 243-252, 1999.

\* cited by examiner

Figure 3

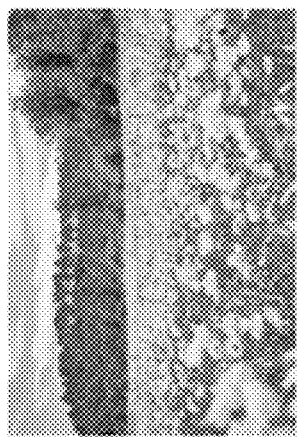
a
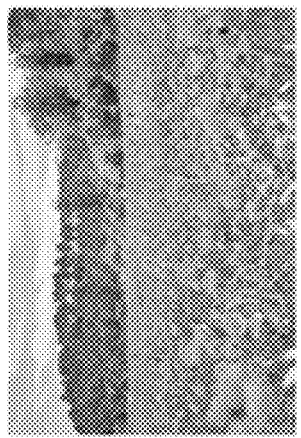
b
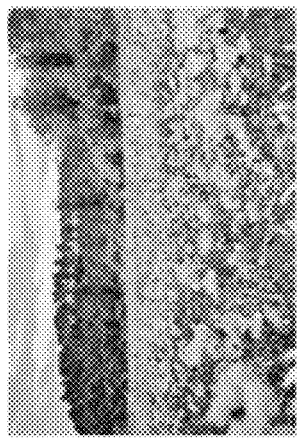
c
Figure 4

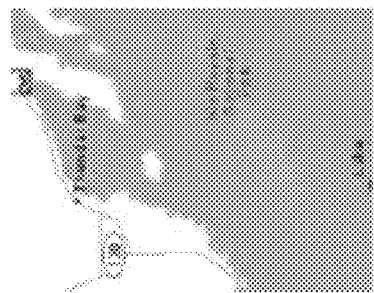
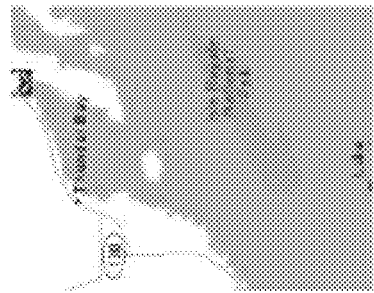
Figure 5

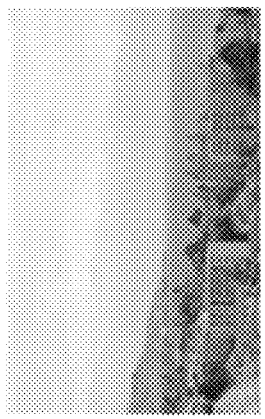
a
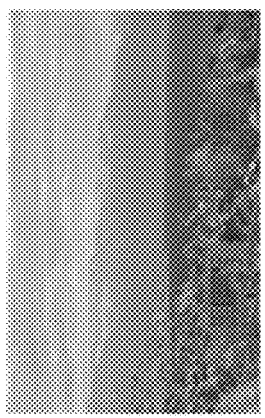
b
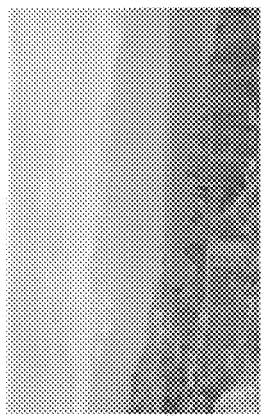
c
Figure 7

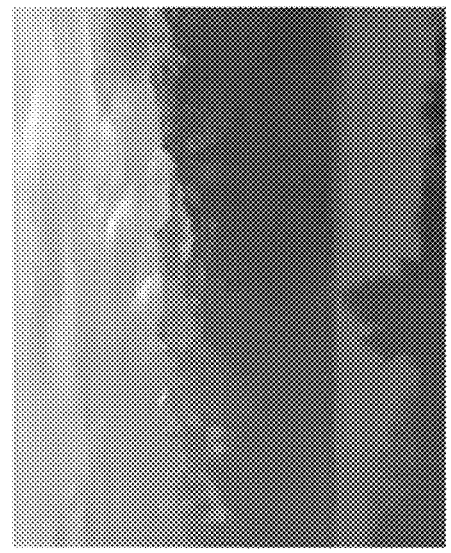
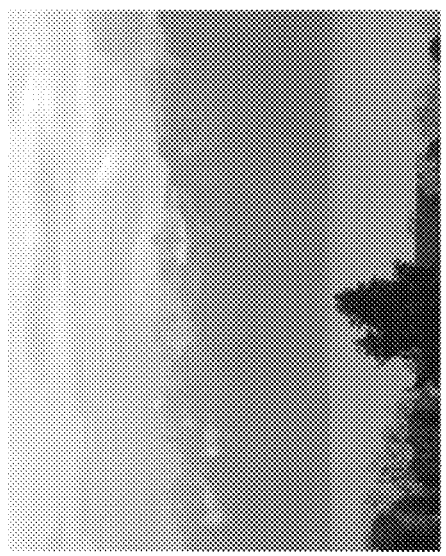
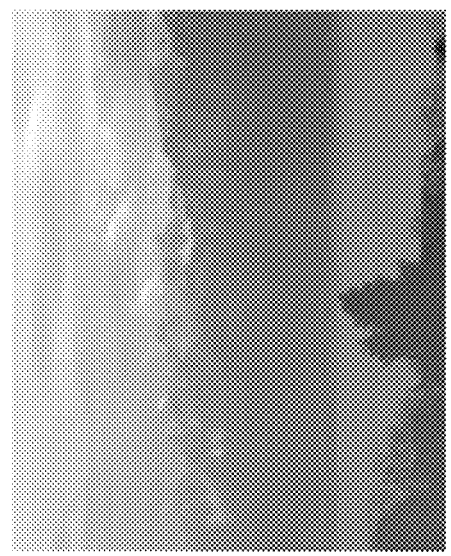
Figure 8

Figure 9

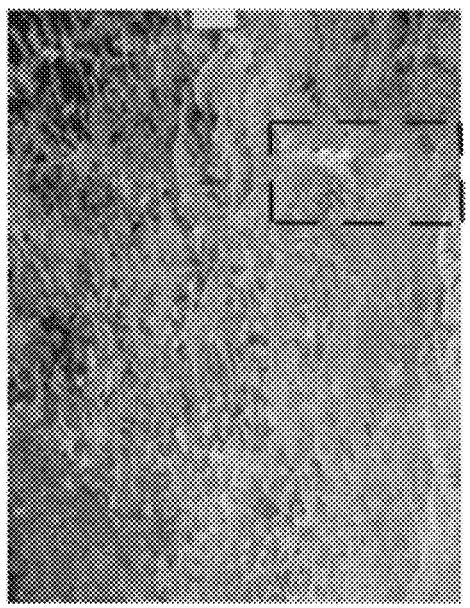
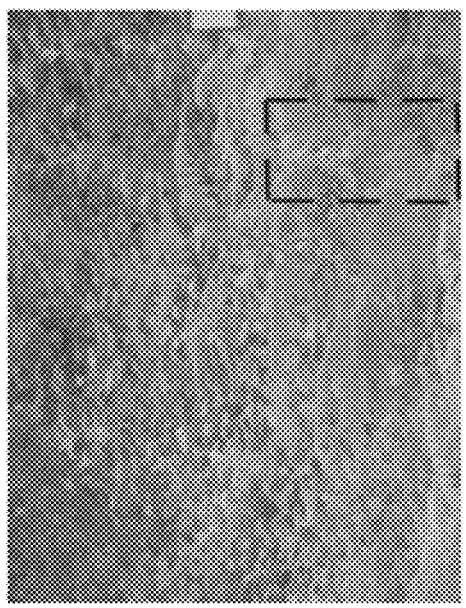
Figure 10

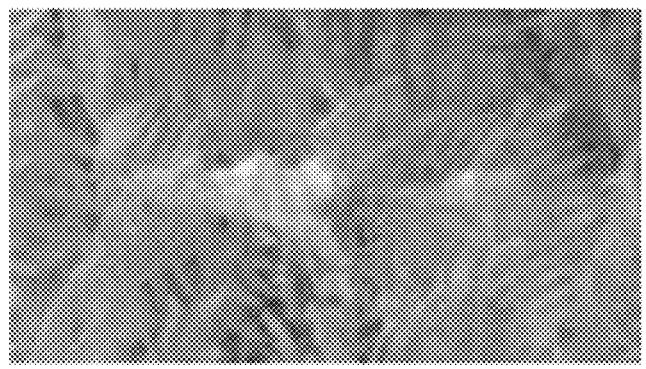
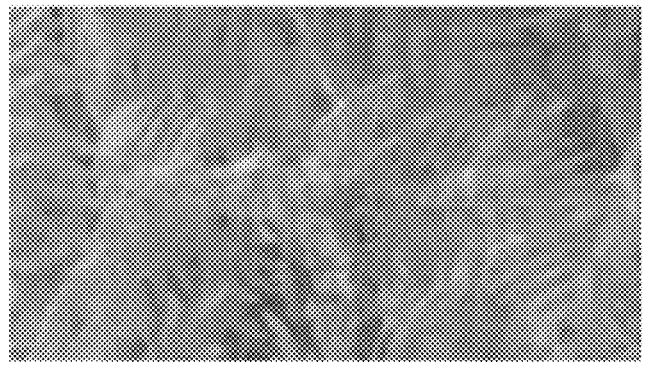
Figure 11

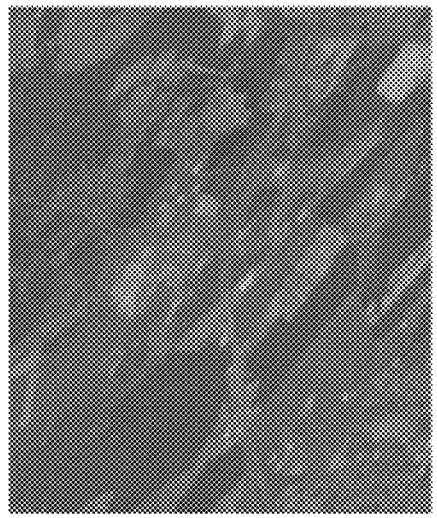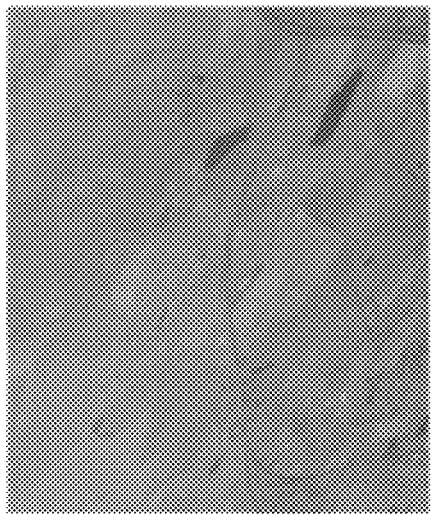
Figure 13

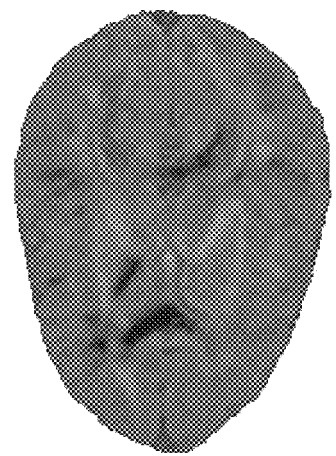
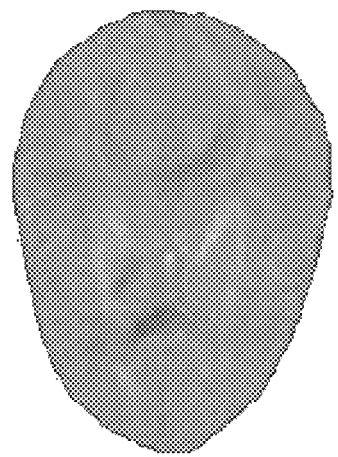
Figure 14

METHOD AND SYSTEM FOR GENERATING ACCENTED IMAGE DATA

CROSS-REFERENCE TO RELATED APPLICATIONS

This application claims priority under 35 USC §119(e) to U.S. Provisional Patent Application 61/244,606, filed Sep. 22, 2009 and under 35 USC §119(e) to GB 0914982.4 filed 27 Aug. 2009, the entireties of which are incorporated by reference herein.

A multitude of different devices capture images that are then displayed on colour monitors. Ultimately the majority are interpreted, or simply enjoyed, by human observers. To go from captured image to visualised image in some cases is straightforward: images captured with an RGB colour camera need only be colour-corrected in order to display an image that is perceptually close to the original scene. However, the situation is not straightforward when, for example, the images are captured outside the visible electro-magnetic spectrum, or when more than three channels are captured.

INTRODUCTION

In many imaging applications a greater number of channels are captured than can be viewed by human observers. While the human visual system can visualise three colour dimensions, many image capture systems capture significantly more than this: multispectral and hyperspectral imaging systems can capture upwards of 200 colour channels, including images captured in the infra-red and ultra-violet ranges.

One way to visualise the information in a multispectral or hyperspectral image is simply to display the section of the signal contained within the visible spectrum; in other words, display the colour image that replicates what would be seen by a human observer. The problem with this approach is that information from additional modalities, such as infra-red and ultra-violet, would be lost. Or, more generally, two spectrally different but metameric colours would be displayed as being identical.

An alternative approach is to blend the information from all channels together and to make a false-colour image that reflects the information content of the component images (see, for example, [1, 2, 3]). While this approach will preserve some information from all different modalities, the colours assigned to each object may be markedly different from the true colours.

In embodiments of this invention we seek to provide a new method that combines properties of both approaches.

According to a first aspect of the invention, there is provided a method of producing accented image data for an accented image including the steps of:
a) decomposing each of a first and a second image into a gradient representation which comprises spectral and edge components; and
b) combining the edge component from the first image with the spectral component from the second image to form a combined gradient representation; and
c) generating accented image data from data including the combined gradient representation.

However, it is possible to start with data representing first and second images, for example a gradient representation of the first and second images.

Preferably the first image, second image, and accented image are each formed of a corresponding plurality of pixels, and step (a) comprises decomposing each pixel of a first and a second image into a gradient representation which comprises spectral and edge components, step (b) comprises combining the edge component from each pixel of the first image with the spectral component from the corresponding pixel of the second image to form the combined gradient representation in respect of that pixel location.

In a preferred embodiment, the method enables contrast from one image to be used to accent features in another image. This can be particularly advantageous where an output image is desired which does not contain the same spectral dimensions of an original image, but where the spectral dimensions of the original image provide useful edge information.

'Spectral dimensions' is used here to mean any data that can be used to form an image or part-image. This could be for example a colour channel or a non-visible modality such as x-rays, sonar or ultrasound.

An example of when such a situation might arise is where the spectral dimensions which provide useful edge information are not in the visible spectrum and cannot therefore easily be visualised. A preferred method according to the present invention is able to import the edge information captured in these spectral dimensions into the spectral dimensions that are required for the output image.

Preferably, the accented image is produced from the accented image data.

Preferably, the first image comprises more spectral dimensions than the second image. Since the accented image preferably has the same spectral dimensions as the second image, a method of image compression can be provided which substantially retains the information present in the first image in an image with the same dimensions as the second image. For example, a hyper spectral image contains many spectral dimensions, which may for example result in a very large electronic image file size or be very difficult to put into a form in which it can be visualised by a human user. Often, such information is presented to a human user in the form of a graph of data corresponding to the different spectral dimensions. These can then only with difficulty be reconciled to the image, introducing the possibility that features of interest are missed. In contrast, a preferred embodiment of the present invention enables information to be retained within an image form and enables it for example to be compressed into an easily visualised RGB image. This RGB image retains the edges resolved by for example a hyper spectral image and therefore enables features clearly resolved only in non-visual spectral dimensions to be accented in the visual image. Whether the image is interpreted by a human user or by a computer, this reduces the time and resources required for identifying features of the image.

Preferably, singular value decomposition is used to calculate the spectral components and the edge components from the gradient representations of the first and second images; and the edge component from the first image is combined with the spectral component from the second image to form the combined gradient representation.

Since preferably a gradient representation is calculated at every pixel of the first and second images, the computational task presented by calculating the spectral and edge components can seem prohibitive. However, in a preferred embodiment of the present invention, singular value decomposition is employed which enables the spectral and edge components to be calculated simply from the gradient representations.

Preferably, each of the first image, the second image and the accented image is formed of a corresponding plurality of pixels, and in step (a), decomposing each of a first image and a second image into a gradient representation comprises calculating a gradient matrix at each pixel of each of the first and second images; further wherein the singular value decomposition includes, for each pixel of the first and second images:

i) calculating a structure tensor as the product of the transpose of the respective gradient matrix with the respective gradient matrix;

ii) calculating the eigenvalues and eigenvectors of the structure tensor to provide the edge components; and iii) using the gradient matrix and edge components to calculate the spectral components; further wherein combining the edge component from the first image with the spectral component from the second image to form the combined gradient representation comprises combining the edge component from each pixel of the first image with the spectral component from the corresponding pixel of the second image to form a gradient matrix for the corresponding pixel location of the combined gradient representation.

Preferably, using the gradient matrix and edge components to calculate the spectral components includes inverting the edge components and multiplying them by the gradient matrix.

Preferably, the combined gradient representation is formed with a gradient tensor that equals a gradient tensor of the first image.

Preferably, forming the gradient representation of the accented image comprises applying a linear transform to the combined gradient representation.

Preferably, the linear transform adjusts the combined gradient representation to make its spectral components closer to the spectral components of the second image while keeping the gradient tensor of the combined gradient representation equal to the gradient tensor of the first image.

Preferably, the accented image data includes a gradient representation of the accented image.

Preferably, the method further comprises step d) forming the accented image by calculating an integral or an approximation to the integral of the gradient representation of the accented image.

In one embodiment, the accented image data includes the accented image.

In one embodiment, step c) includes generating accented image data from the combined gradient representation and one or more of the first and second images.

In one embodiment, generating accented image data includes adding a fraction of the divergence of the combined gradient representation to one or more of the first and second images.

Preferably, the second image is derived from the first image.

Preferably, the first image is a hyperspectral image and the second image is a colour image.

The method can be applied to image components indexed by scale and can be used on one or many scales.

According to a second aspect of the invention, there is provided a method of producing accented image data for colour-deficient observers employing the method according to the first aspect of the invention, wherein the first image is an RGB image and the second image is a reduced-colour image.

According to a third aspect of the invention, there is provided a computer program comprising computer program code means for performing the steps of any of the methods according to the first or second aspect when said program is run on a computer.

According to a fourth aspect of the invention, there is provided a display device driver including the computer program according to the third aspect, wherein the display device driver is configured to produce and display the accented image on a display to emphasise features in accordance with predetermined criteria.

According to a fifth aspect of the invention, there is provided an image generation system comprising:

a first component operable to decompose a first image into a gradient representation comprising spectral components and edge components, and to calculate the edge components;

a second component operable to decompose a second image into a gradient representation comprising spectral components and edge components, and to calculate the spectral components; and a third component arranged to combine edge components of the first image and the spectral components of the second image to form a combined gradient representation and to generate accented image data from data including the combined gradient representation.

Preferably, the image generation system further comprises a fourth component to generate the accented image from the accented image data.

Preferably, the image generation system further comprises an image capture device operable to capture the first image.

Preferably, the image capture device is operable to capture the second image.

In one embodiment, the image generation system further comprises an image divider operable to derive the second image from the first image.

Preferably, the image capture device is configured, when capturing the first image, to capture image data corresponding to predetermined spectral dimensions particularly suitable to detection of a feature of interest.

Preferably, the image generation system further comprises a processing unit that is configured to detect automatically features of interest in the accented image based on increased contrast in the accented image data.

According to a sixth aspect of the invention, there is provided a medical scanner incorporating an image generation system according to the fifth aspect.

According to a seventh aspect of the invention, there is provided a satellite imaging system incorporating an image generation system according to the fifth aspect.

According to an eighth aspect of the invention, there is provided a printing system arranged to print a received image using a plurality of inks, wherein the printing system is arranged to process the received image using the image generation system of the fifth aspect, and is arranged to print the generated accented image, the accented image being generated in dependence on the plurality of inks.

Preferably, the received image serves as the first image for the image generation system, and the printing system further comprises a processing unit configured to derive the second image for the image generation system from the first image in dependence upon the plurality of inks.

According to a ninth aspect of the invention, there is provided a data fusion system incorporating an image generation system according to the fifth aspect, wherein the image capture device is operable to capture a plurality of images from different modalities and to combine the plurality of images into the first image.

Preferably, the different modalities include at least two of the visible spectrum, near infra-red, ultrasound, infra-red, x-ray, magnetic resonance imaging (MRI), and positron emission tomography (PET).

In embodiments of the present invention, we present a generic image visualisation algorithm, to preserve the contrast of the original image in its visualisation. To do this we firstly generate a putative colour-version of the scene, which can be either a true-colour image (for example a multispectral-colour image projected onto the colour-matching functions) or false-colour image (for example a greyscale image put through some semi-automatic colorization routine). The method then takes the contrast of the original image, defined by DiZenzo's structure tensor, and imposes it on the putative colorized image. The final image retains the look and feel of the putative colour-assignment, while at the same time maintaining the true local-contrast information of the original image.

The method can be applied to a number of imaging problems, and here we show examples from hyperspectral and multispectral imaging, visualising images for colour-blind observers, and a visualisation task where the input data are derived from diffusion tensor measurements of a human brain.

An advantage of preferred embodiments is in creating an image that contains the same information as a high-dimensional image (here, we preserve the gradient), but also colours regions in approximately correct colours—so grass should be green, sky blue, etc. In the limit, where all the gradient information in the original scene is exactly captured by a colour image, preferred embodiments of the method simply return the ordinary colour image.

The image fusion method of Socolinsky and Wolff [4, 5] describes a method for visualising a multi-spectral image as a one-dimensional greyscale image by preserving the gradient of the original high dimensional image. Clearly this is applicable only in a select number of cases. Embodiments of the present invention seek to visualise colour rather than greyscale. Drew and Finlayson [6] give a technique for imposing the contrast of a greyscale image onto a colour image in a colorization application. An advantage of embodiments of the present invention is that they can be used to impose the gradient from, not just a greyscale image onto a colour image, but any image onto any other dimensional image, e.g. from multispectral or hyperspectral to RGB colour image.

In embodiments of this invention we consider the situation where we have arrived at a colour image via some method, e.g. a false-colour image from medical diffusion-tensor data, say. We treat this as a first approximation of the correct image colours. Now we go on to include gradient information from all data channels by imposing upon the initially calculated the gradient of the higher-dimensional multispectral image.

To evaluate the approach we explore four different applications in particular: the visualisation of colour images by colour-deficient observers (mapping from 3 to 2 dimensions); the visualisation of multispectral images (31 to 3 dimensions); the visualisation of hyperspectral satellite image (224 to 3 dimensions); and the incorporation of a near-infra-red image into a colour image (4 to 3 dimensions). For each application the types of images produced may differ markedly, but the application of the method according to embodiments of the invention is unchanged.

Preferred embodiments of the invention will now be described, by way of example only, with reference to the accompanying drawings, in which.

Figure 6:
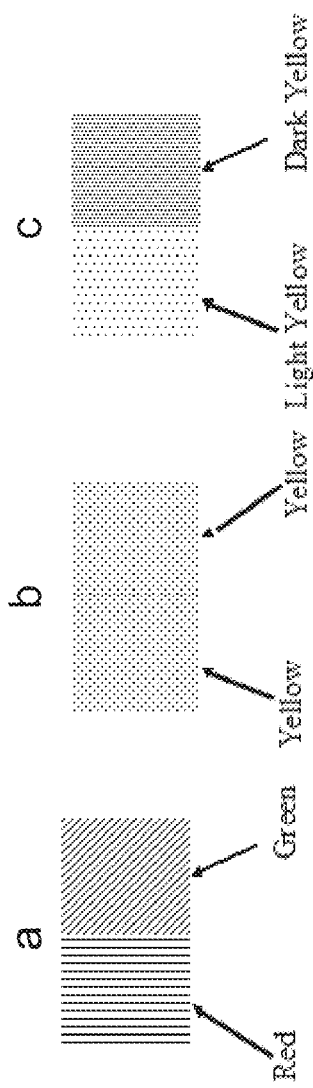

FIGS. 3a-c, 4a-c, 5a-c and 6a-c provide examples of results of images adjusted for dichromats in which FIGS. 3a, 4a, 5a and 6a show an original colour image, FIGS. 3b, 4b, and 5b show an image adjusted for dichromats using a standard technique, FIG. 6b shows a simulation of FIG. 6a as seen by a dichromat and FIGS. 3c, 4c, 5c and 6c show the image adjusted for dichromats using a method according to an embodiment of the present invention;

FIGS. 7a-c show an original colour image, an infra-red image, and an accented image produced by a method according to an embodiment of the present invention;

FIG. 8a-d show respectively an original colour image, an infra-red image, an accented image produced by a method according to an embodiment of the present invention, and an accented image produced by a method according to an embodiment of the present invention with just infra-red content, applied to RGB colour;

FIGS. 9a-b and FIGS. 10a-b show, in FIGS. 9a and 10a, a synthetic RGB image calculated from a multispectral image, and in FIGS. 9b and 10b, an accented image produced by a method according to an embodiment of the present invention;

FIGS. 11a and 11b show enlarged sections of FIGS. 10a and 10b respectively;

FIGS. 12a-c show respectively a graph showing data corresponding to a multispectral image of a pair of metameric surfaces, a synthetic sRGB image containing the two surfaces, and an accented image of the pair of metameric surfaces produced by a method according to an embodiment of the present invention;

FIGS. 13a-d show respectively a true-colour rendering of an original image, an image generated by mapping the range of captured wavelengths to the range of visible wavelengths and then projecting the resulting function on the sRGB colour matching functions, an image generated by firstly mapping M-D to 3-D using PCA, and an image produced by a method according to an embodiment of the present invention;

FIG. 14a-b show a brain image generated from a conventional technique, and by a method according to an embodiment of the present invention respectively; and FIG. 15a shows three RGB colour channels and FIG. 15b shows a fourth channel which together form a 4 channel image used in a method according to an embodiment of the present invention.

The accompanying drawings are greyscale depictions of the images to which reference is made in the description. These have been converted to greyscale so as to best reflect the relevant characteristics of the colour image to which the description refers but owing to the limitations of the conversion do not show true results.

Figure 1:
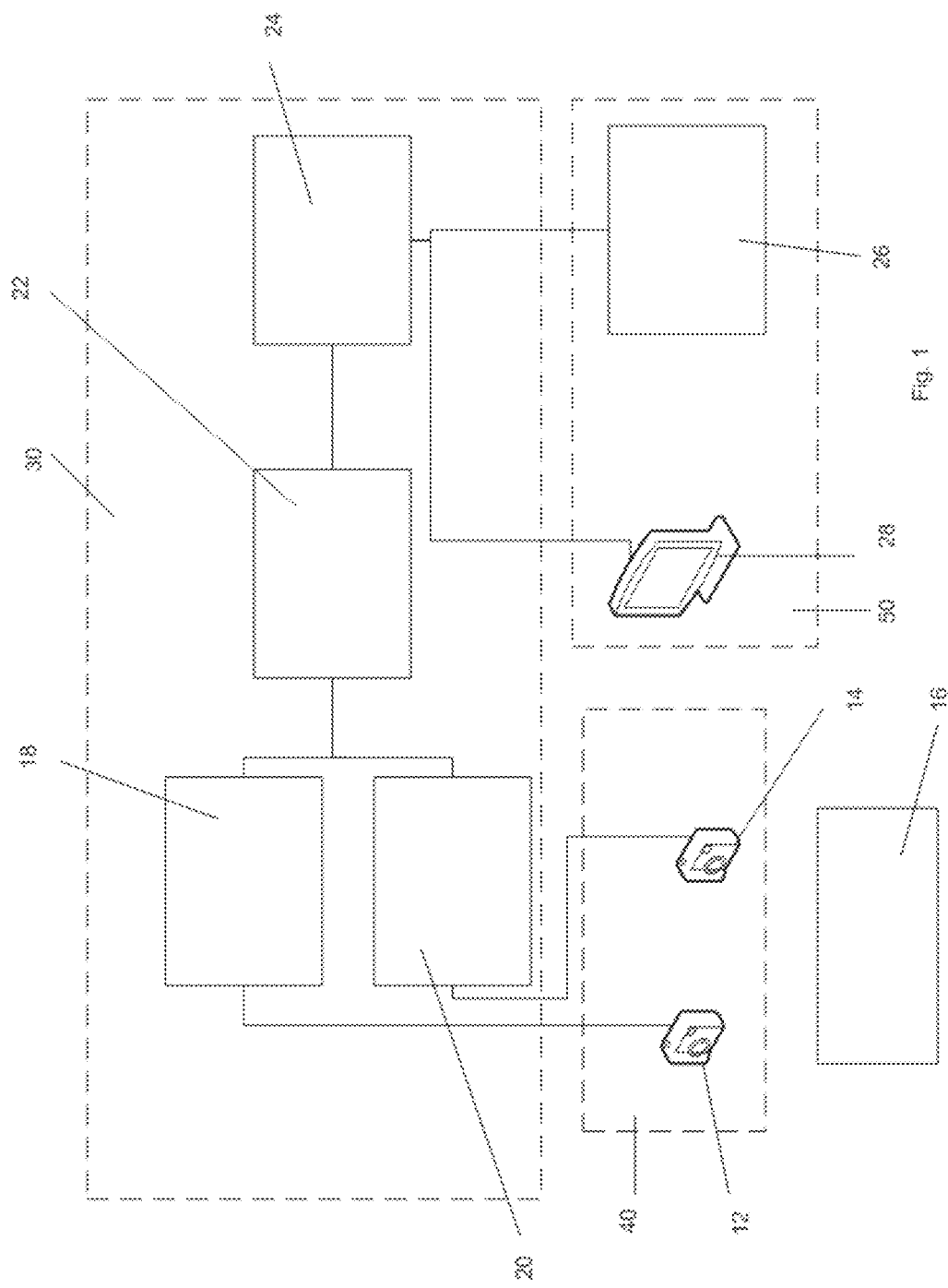
FIG. 1 is a schematic diagram of an image generation system in accordance with an embodiment of the invention.

With reference to FIG. 1, an image generation system 10 comprises an input system 40, a processing system 30 and an output system 50.

Preferably, input system 40 comprises a first image capture device 12 and a second image capture device 14. Each image capture device 12, 14 is selected to be operable to capture data corresponding to respectively first and second predetermined wavelength ranges.

The first predetermined wavelength range, for the first image capture device 12, is selected to be a wavelength range which resolves particular features of interest with optimum contrast. Examples of such wavelength range selection are provided below. One example is one which includes an infra-red wavelength range for resolving contrast between warm and cold features, for example to identify living creatures or bodies of water.

The second predetermined wavelength range, for the second image capture device 14, is selected to be a wavelength range suitable for a final output image. This can be for example an RGB wavelength range suitable for display to a user. Other examples are provided below.

Each of the first and second image capture devices 12, 14 preferably capture an image in response to reception of a signal. Preferably, the first and second image capture devices are configured such that a single signal causes a first image and a second image to be captured simultaneously by the first and second image capture devices respectively. The signal can be supplied in response to actuation of a manual control, a clock pulse from a timing device, or can be provided by an automatic signal generator. The automatic signal generator may for example be configured to generate the signal in response to detection of a feature of interest by a separate sensor.

The system 10 further comprises an edge detection processor 18 and a spectral dimension extraction processor 20. The edge detection processor 18 is arranged to receive data corresponding to the first image. It is further configured to decompose the data corresponding to the first image into a gradient representation comprising spectral components and edge components. It is configured to extract and output only the edge components of the gradient representation of the first image.

The spectral dimension extraction processor 20 is arranged to receive data corresponding to the second image. It is further configured to decompose the data corresponding to the second image into a gradient representation comprising spectral components and edge components. It is configured to extract and output only the spectral components of the gradient representation of the second image.

Spectral components are preferably those components that relate to the spectral dimensions of an image. Spectral dimensions can be dimensions that relate to a particular electromagnetic wavelength or wavelength range. Examples of spectral dimensions are colour channels such as red, green and blue. However, they are not restricted to the visible spectrum and can include infra-red or X-rays.

Details of the processing which can be employed to extract the spectral and edge components of the gradient representations of the first and second images are provided below. However, preferably, the processors 18, 20 use singular value decomposition. As explained in more detail below, this is preferably achieved by finding a structure tensor which is defined as $JJ^T$, where J is the gradient representation, and then by finding the eigenvalues and eigenvectors of the structure tensor. This enables the spectral components to be calculated, preferably by the method used to find the Moore-Penrose pseudo-inverse of a matrix. It turns out that this decomposition provides both the edge components and the spectral components in the same calculation.

Each of the first and second image capture devices are preferably configured to capture the first and second images such that the first and second images are composed of a plurality of corresponding pixels. One way in which this can be achieved is for the first and second image capture devices 12, 14 both to be directed at a target 16 such that their field of view is the same and a pixel captured by the first image capture device 12 corresponds to the equivalent pixel of the second image capture device.

In other embodiments, the first and second image capture devices 12, 14 have overlapping but different fields of view. In these embodiments, the first and second image capture devices 12, 14 are each further provided with an image manipulator which is configured to crop the captured image to form the first and second image respectively from only the overlapping part of the captured image. Alternatively, a single image manipulator can be provided to receive the captured image from the first and second image capture devices 12, 14 and to crop each of the captured images to their mutually overlapping part to form the first and second images.

An image combiner 22 is configured to receive the output edge components from the edge detection processor 18 and the output spectral components from the spectral dimension extraction processor 20. The image combiner 22 is configured to form a combined gradient representation by combining the edge components from the edge detection processor 18 and the spectral components from the spectral dimension extraction processor 20.

Preferably, edge components comprise the spatial direction and magnitude of the derivative, and the spectral components comprise the direction change in colour-space of the derivative.

It is to be noted that the term 'colour' is not necessarily restricted to the visible spectrum, but refers more generally to a point or range in the electromagnetic spectrum.

An image reconstruction processor 24 is configured to receive the combined gradient representation and to reconstruct accented image data from it. Preferably, the image reconstruction processor 24 is configured to integrate or to approximate the integral of the combined gradient representation to form the accented image data.

The image reconstruction processor 24 can be configured to output the accented image data to be saved on a data storage medium 26, or directly displayed on a display device 28. The display device 28 can display an accented image corresponding to the accented image data to a user. However, it is to be noted that the accented image may be constructed of colours not only in the visible spectrum. In such a case, the accented image can still be saved on a data storage medium 26, but may require further processing before it can be displayed to a user on a conventional display device 28. Such further processing can for example be provided by a processor which converts the accented image to a visual accented image by mapping each colour of the accented image to a unique colour of the visible spectrum.

In some embodiments, input system 40 comprises a single image capture in place of the first and second image capture devices 12, 14. The single image capture device is operable to capture data corresponding to both first and second predetermined wavelength ranges. In these embodiments, the processing system 30 is replaced by the processing system 32 depicted in FIG. 2. This is the same as the processing system 30 except that it comprises an additional image divider 34 which is operable to receive the captured image from the input system. The image divider 34 is configured to split the received image into the first and second images in accordance with a predetermined function. One example of such a predetermined function is one which provides the first image as the unaltered received image, and copies the RGB components of the received image to create the second image.

In embodiments in which there is a single image capture device, the single image capture device is configured to capture the first image in response to the signal, and the image divider 34 is configured to calculate or otherwise derive the second image from the first image in response to the capture of the first image as described above.

The processing system 30, 32 can be implemented without an image capture device, and can operate in response to receiving images already in existence. With the processing system 30 of FIG. 1, the first image can be input directly into the edge detection processor 18 and the second image can be input directly into the spectral dimension extraction processor 20. With the processing system 32 of FIG. 2, the first image can be input directly into the image divider 34.

In addition, the processing system 30, 32 does not need to output to a display device 28 or a data storage medium 26, but can output directly to a device for interpreting or processing the accented image further. Examples are provided below.

The system 10 is preferably operated in the following way. The first and second image capture devices 12, 14 are directed at a target 16. The signal is provided, preferably by actuation of a manual control, to cause the first and second image capture devices to capture respectively first and second images of the target 16.

Data corresponding to the first image passes to the edge detection processor 18, and data corresponding to the second image passes to the spectral dimension extraction processor 20. These processors 18, 20 preferably extract a gradient representation from the image data as described above. Edge components of the gradient representation corresponding to the first image and spectral components of the gradient representation corresponding to the second image are passed to the image combiner 22 which forms a combined gradient representation as described above and passes it to the image reconstruction processor 24 which constructs an accented image, preferably by integrating or approximating the integral of the combined gradient representation.

The accented image can then be displayed on a display device 28 and/or stored in data storage 26.

An advantage of the system described above is that edge information from a first wavelength range can be imposed on an image formed in only the second wavelength range. Such a system enables features which are not particularly well resolved by the second wavelength range to be accented by information from a first wavelength range. This can be particularly advantageous where it is desired to output an image in only the second wavelength range. An example is if it is desired to output an image in the visible spectrum for observation by a human user, but features of interest are better resolved by a different wavelength, for example by infra-red or X-ray. The above describes a system which can provide an image in the only the second wavelength range and still be able to resolve the features of interest with clarity.

Although, the accented image will not necessarily show the true image in the wavelengths it uses, features which those wavelengths in the second wavelength range may not be able to resolve may be seen clearly from the edges imported from the image in the first wavelength range. In other words, a single accented image can be formed which retains both the spectral and edge information of the different images.

The applications of this system are wide and varied. It can for example be employed in an observation system such as one which utilises satellite imaging. Some features, such as living creatures and bodies of water, are better resolved by infra-red wavelengths than visible wavelengths owing to the temperature difference those features often have with their surroundings. A satellite image taken in the visible spectrum may therefore suffer from the problem that such possibly key features are difficult to identify, whereas a satellite image taken in infra-red wavelengths would be difficult to display to a user. Where an infra-red image is displayed to a user, it is often only a greyscale representation of the infra-red data, and features that are shown by the colour of a visible spectrum image are not as easily identifiable. It is therefore often necessary to compare the two images side-by-side.

The system described, however, enables the visible spectrum image to be accented by the data from the infra-red image so those features resolved by the infra-red image stand out clearly in the image while the features resolved by visible colours are still shown.

Furthermore, the accenting of the visible spectrum image is not restricted to features resolved by infra-red wavelengths, but could be accented by any region of the electromagnetic spectrum or sound or other data. Using radio or microwave wavelengths may for example be able to accent communication centres or radio transmitters. This can be employed in for example military reconnaissance operations.

The system can also be used in medical imaging. In medical imaging, there is a variety of different means to construct an image, with each of the imaging techniques providing valuable and potentially critical information. The present system can be used for example to construct an image which combines the information from multiple scans or imaging techniques to allow a medical practitioner to perform a fast and accurate diagnosis. For example, the first image can be an MRI image, and the second image can be a CT scan image. In some embodiments, the CT scan data is added as further colour to the first image, and an ultrasound image is used as the second image. Different combinations are of course possible. However, in these examples, a first image in which different spectral dimensions (wavelengths of the electromagnetic spectrum) depict different features can be accented by edge information from a second image to bring out features of interest. Wavelengths or wavelength ranges in the accented image can then be mapped to a visible colour to form a visual accented image for display to a user.

Another embodiment of the system relates to a security scanner such as is used at high-security checkpoints such as at airports for generating an image in which information corresponding to various scanning frequencies are provided together. In this way, frequencies which detect for example different types of prohibited material can be used to generate a single image in which different types of material can be resolved notwithstanding the fact that different frequency ranges are required to detect them.

In the examples described, it is not necessary that the accented image be displayed to a user. It may be processed by a computer aided detection processor to identify features of interest automatically. This can avoid the step in some embodiments of mapping the accented image to a visual accented image. A computer aided detection processor can of course work with accented image data representing an accented image in a non-visible or only partly-visible wavelength range.

One embodiment of the system 10 in which the first and second image capture devices 12, 14 are not required relates to a printing system. It is often more economical to use fewer types or colours of ink in a printing system for example by using two instead of three colours. Furthermore, printers with multiple ink colours can often run out of one ink colour before the others, leaving it in a state in which it still has ink remaining but cannot produce full colour results. Such printing systems can sometimes produce results which lack the necessary contrast. This is particularly true when the contrast change is substantially in the colour that has been omitted or used up from the inks.

Figure 2:
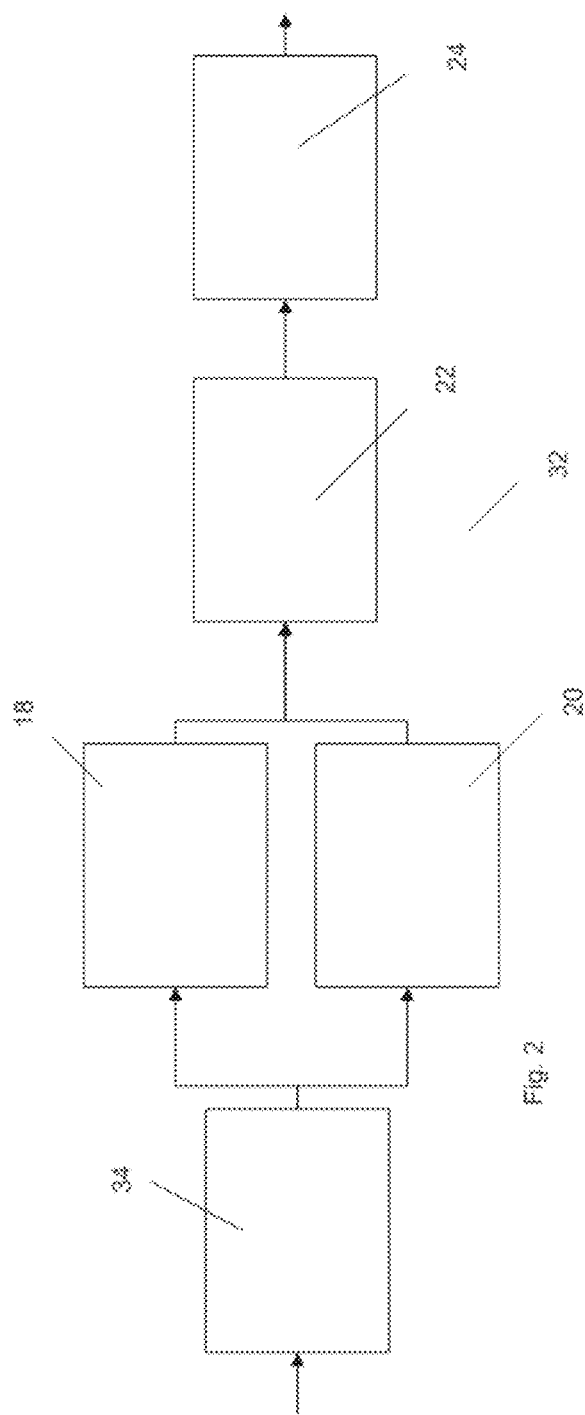
FIG. 2 is a schematic diagram of a processing unit for use in an image generation system in accordance with another embodiment of the invention.

A printing system according to this embodiment comprises a processing system 32 as depicted in FIG. 2 and a printer (not shown) which has a specific number of available ink types. The image divider 34 is configured to receive an image to be printed. The received image can come for example from a computer in response to a print command. The image divider 34 is configured to pass the received image to the edge detection processor 18 as the first image. The image divider 34 is further configured to copy from the received image colour channels corresponding to the inks available in the printer to form the second image, which is then passed to the spectral dimension extraction processor 20.

The first and second images are then processed as described above such that the image reconstruction processor 24 outputs an accented image containing only colour channels that are available to the printer, but retains the contrast of the originally received image to be printed.

The processing system 32 depicted in FIG. 2 can be implemented in software or firmware as a display driver. In this embodiment, the image divider 34 is configured to receive an image to be displayed. The image divider 34 is configured to pass the received image to the edge detection processor 18 as the first image. The image divider 34 is further configured to copy colour channels corresponding to predetermined criteria from the received image to form the second image. The second image is then passed to the spectral dimension extraction processor 20. The accented image output by the image reconstruction processor 24 is passed to be displayed by a display device.

The predetermined criteria for selecting the colour channels to form the second image can be selected in order to assist a visibility impaired user to resolve important features in the displayed image. In some embodiments, the predetermined criteria include a selection to remove colours which cannot be resolved by a partially colourblind user. When the edge components of the originally received image are used to accent the second image in these embodiments, the accented image enables the display device to show an image such that features that would not normally be easily visible to a partially colourblind user, for example because the main contrast is in the colour channel the user cannot resolve, are clearly displayed.

In section 2 we outline the mathematical theory that underpins methods according to embodiments of the present invention. In the third section we describe the computational implementation of the methods, and outline some of the problems which arise when applying the methods in practice. In the fourth section we show the results of the methods for some proposed applications, and in the fifth section we relate the method to other approaches for visualisation.

Section 2

2.1 Colour Gradient to Greyscale

An advantage of methods according to embodiments of the present invention is that they can preserve the gradient of a higher-dimensional image in a lower-dimensional representation. We start by calculating the image contrast, which we do based upon the calculations outlined in the Di Zenzo's work [7], which was later employed by Socolinsky and Wolff [1]. Defining a multi-channel image as a vector-valued function f which maps the 2D plane $\mathbb{R}^2$ onto an N-dimensional colour-space $\mathbb{R}^N$, the gradient of the image at a point $(x_0, y_0)$ is given by the gradient matrix:

$$J = \begin{bmatrix} \frac{\partial f_1}{\partial x} & \frac{\partial f_2}{\partial x} & \cdots & \frac{\partial f_N}{\partial x} \\ \frac{\partial f_1}{\partial y} & \frac{\partial f_2}{\partial y} & \cdots & \frac{\partial f_N}{\partial y} \end{bmatrix} \quad (1)$$

where the function $f_i(x, y)$, which maps $\mathbb{R}^2$ onto $\mathbb{R}$, is the ith channel. The gradient matrix J contains the partial derivatives of f in the x and y directions, and also specifies the gradient in an arbitrary direction $d = [\cos\theta, \sin\theta]$ as d J. Assuming a Euclidean metric, the magnitude of the gradient m in an arbitrary direction is thus given by:

$$m^2 = dJJ^T d^T. \quad (2)$$

The 2×2 matrix $JJ^T$ is Di Zenzo's structure tensor [7], and this determines the gradient magnitude in any direction d. Since the structure tensor is a 2×2 matrix, the complete gradient information can be determined by just two separate directions. Since the structure tensor is a real symmetric matrix, it is thus diagonalizable into the form:

$$JJ^T = V\Lambda V^T \quad (3)$$

where the real orthogonal matrix V has columns made up of the eigenvectors, $v_1$ and $v_2$, of $JJ^T$ and the diagonal matrix $\Lambda$ has diagonal entries which are the eigenvalues $\lambda_1$ and $\lambda_2$. Alternatively, Eq. 3 can be written as:

$$JJ^T = \lambda_1 v_1 v_1^T + \lambda_2 v_2 v_2^T \quad (4)$$

This equation makes the relation explicit: the Di Zenzo matrix $Z = JJ^T$ can be written as the sum of two rank-1 gradient matrices constructed from its eigenvectors and eigenvalues. The eigenvectors give the directions in x, y of maximal and minimal change, with eigenvalues giving the corresponding rates of change (see [8]).

In their work on multispectral-to-greyscale conversion Socolinsky and Wolff [4, 5] reduce this two-dimensional gradient quantity to a one dimensional quantity. Assuming that the eigenvalues and eigenvectors of $JJ^T$ are ordered such that $\lambda_1 > \lambda_2$, then the 1-D matrix $\gamma_1 v_1 v_1^T$ is the closest rank-1 matrix to the structure tensor in the least squares sense and the vector $\sqrt{\gamma_1} v_1$ represents the 1-D gradient vector that best represents the N-dimensional gradients for each pixel. It is noted here that while the sign of $v_1$ is undefined, this can be made to agree with the sign of a derived scalar image (e.g. a luminance image). Thus, Socolinsky and Wolff define the gradient field V of the colour image as the quantity $\sqrt{\gamma_1} v_1$, which gives a single gradient direction ($v_1$) and magnitude $\sqrt{\gamma_1}$, for each pixel. By reintegrating this gradient field they derive a greyscale image whose gradient closely matches that of the colour original.

When a greyscale image exists whose gradient exactly matches V at each point, then the gradient field is said to be integrable. When this condition does not hold, and the gradient field is non-integrable (which is true for the 1-D gradient derived from most ordinary colour images), Socolinsky and Wolff solve the problem in the least squares sense, i.e. they seek a greyscale image G that minimises the error:

$$\min_G \sum_{\forall (x,y)} \|\nabla G(x, y) - V(x, y)\|^2, \quad (5)$$

where V is the vector field generated from the original colour image. The solution to Eq. 5 is then given by the solution to Poisson's equation:

$$\nabla^2 G_{soc} = \text{div}(V) \quad (3),$$

where $\nabla^2$ denotes the Laplacian operator and div (•) is the divergence.

2.2 Greyscale Gradient to Colorized Image

In [6], in the context of colorization, this idea is reversed: instead of taking the gradient of a colour image and finding a greyscale image which best approximates it, an input greyscale image is taken and a colour image is created that has the same contrast.

In methods according to embodiments of the present invention, we note that starting with an RGB colour gradient J, Eq. 3 can be factorized into the form:

$$JJ^T = V\sqrt{\Lambda}\sqrt{\Lambda}V^T \quad (7)$$

Here the matrix $\sqrt{\Lambda}$ is a diagonal matrix with entries $\sqrt{\gamma_1}$ and $\sqrt{\gamma_2}$. This equation can now trivially be extended to include the identity matrix I.

$$JJ^T = V\sqrt{\Lambda}I\sqrt{\Lambda}V^T \quad (8)$$

This can be further expanded by writing the identity matrix as the multiplication of any row-orthonormal 2×N matrix O with its transpose; i.e. given O with O $O^T$=I, this leaves us with:

$$JJ^T = V\sqrt{\Lambda}OO^T\sqrt{\Lambda}V^T \qquad (9)$$

Thus we have a general form for equality of Di Zenzo matrices $Z=JJ^T$: if 2×2 matrices V and $\sqrt{\Lambda}$ are equal, for images of any dimensionality, then their Di Zenzo matrices are also equal.

Now suppose we have a Singular Value Decomposition (SVD) of a colour image that has gradient J, i.e., $J=V\sqrt{\Lambda}O$, where J is of size 2×3 and colour gradient O is also of size 2×3. This decomposition is powerful from an explanatory point of view, as it decomposes the image into a gradient representation which comprises spectral and edge components. We can now describe J as the conjunction of three elements: V gives the gradient direction in the domain of the image function (the spatial co-ordinate system), $\sqrt{\Lambda}$ defines the magnitude of the gradient, and O describes the direction of change in the range of the image function (the colour space): i.e. O determines whether the local colour change is from red to blue, black to white, etc. The first eigenvector of the row-space of O is associated with the direction of maximum variance in colour space. In other words, $V\sqrt{\Lambda}$ gives the edge component and O the spectral component.

If J is the gradient for a colorized version of a greyscale image G, then we can ensure that the resulting re-integrated colour image, which results from integrating the colour gradient in each colour channel, has Di Zenzo matrix equal to that of G by simply keeping the colour-gradient part O unchanged, but substituting the space-varying parts (the edge component) in the SVD decomposition from those for the input greyscale image.

The signs of eigenvectors must match, for the colorized image and the grey image. But overall, imposing the grey gradient onto a putative colorized version simply amounts to using the grey image gradients space-varying factors. The result is that the colorized image is changed, so as to better reflect in the resulting colour contrast the contrast from the input greyscale image.

3 Imposing Higher-Dimensional Gradient on Lower-Dimensional Image 3.1 General Scheme In preferred embodiments of the present invention, instead of applying the vector field of a low-dimensional image to a higher dimensional image, we describe the application of the gradient field of a high-dimensional image to that of a low dimensional image. A number of new applications become possible, which are described below.

A more algorithmic description of a generic M to N transform according to embodiments of the invention (where M>N) can now be described as follows:

Given a higher-dimensional image $I_M$, compute a corresponding lower-dimensional image $I_N$ with correct colours (e.g. convert a hyperspectral image to its colour counterpart, or leave out the near-infra-red (NIR) channel from a 4-channel colour+NIR image);

Compute, at each pixel, the gradient matrix $J_N$ for the low-dimensional image, and decompose it into spectral and edge components using the singular value decomposition into $V_N$, $\Lambda_N$ and $O_N$: $J_N = V_N \Lambda_N O_N$;

Compute, at each pixel, the gradient matrix $J_M$ for the high-dimensional image and decompose it in the same way into $V_M$, $\Lambda_M$, and $O_M$ Create a new gradient matrix $J_N^{new}$ by substituting the edge component $V_M$ and $\Lambda_M$ of the higher dimensional image into the decomposition for $J_N$. This is able to combine the edge component of the gradient representation of the higher dimensional image with spectral component of the gradient representation of the lower dimensional image to form a combined gradient representation. This gradient matrix will have the same colour direction as the original N-dimensional image, but the same structure tensor as the M-dimensional image.

$$J_N^{new} = V_M \sqrt{\Lambda_M} O_N \qquad (10)$$

Now that we have x and y gradients in N colour channels (the rows of $I_N^{new}$), we can reintegrate each of the gradient fields separately using one of a range of possible methods ([9, 10]).

3.2 Details of Scheme

We need not be restricted to replacing the spatially-dependent parts of the SVD decomposition of the colour gradient $J_N$ with those of $J_M$ (with M>N) to guarantee equality of the Di Zenzo matrices. Instead, we can loosen the replacement whilst still maintaining equality of the Z matrices.

For suppose our putative N-D gradient is $\tilde{J}$ (e.g., a 2×3 colour-gradient matrix for an RGB image). Suppose our target is to replace this colour-gradient with a new one, J, such that for the new gradient, the Di Zenzo matrix $Z_N$ just equals that for the matrix $Z_M$ for the higher-dimensional image. To do so, we seek a 2×2 matrix A such that $$J = A\tilde{J} \qquad (11)$$

Since $\tilde{Z}_N = \tilde{J}\tilde{J}^T$ the desired relation between Di Zenzo matrices is thus $$A\tilde{Z}_N A^T = Z_M \qquad (12)$$

So any such A will provide equality of Di Zenzo matrices. One solution of Eq. (12) is given by $$A\sqrt{\tilde{Z}_N} = \sqrt{Z_M} \qquad (13)$$

where the square root is unique, for the positive semi-definite symmetric matrices above. A complete set of solutions can generalize the above solution for A by adding any rotation matrix R:

$$A = \sqrt{Z_M} R (\sqrt{\tilde{Z}_N})^{-1} \qquad (14)$$

still satisfies Eq. (12) and hence delivers equality of Di Zenzo matrices—i.e., higher-dimensional $Z_M$ will result from the lower-dimensional gradient J generated according to Eq. (11).

Since we are free to choose any rotation R, let us choose one so as to generate a new colour gradient J that approximates as closely as possible the original, putative colour gradient $\tilde{Z}_N$, i.e., $J \approx \tilde{J}$. This implies $$\sqrt{Z_M} A \approx R\sqrt{\tilde{Z}_N} \qquad (15)$$

Eq. (15) is referred to as the Orthogonal Procrustes problem [11]. Its solution is given in terms of the SVD factorization) ($\sqrt{\tilde{Z}})^T \sqrt{Z_M}$ =DTTE by rotation R=E $D^T$.

This can therefore be used to find R which in turn can be used to calculate the A which in equation (11), and in accordance with equation (12), combines the spectral component of $\tilde{J}$ with the edge component from the higher-dimensional image to form combined gradient representation J.

4 Implementation of the Method

Section 3.1 shows the basic idea of how contrast can be swapped from one image to a second. Section 3.2 then gives a more detailed account of how this is done. The two sections describe two different methods that are actually two different instantiations of the same basic notion—of forcing the contrast of one image to have the same colour gradients as the second. Below is a slightly deeper technical argument.

If we generate a new jacobian J' from the approach in section 3.2 then we can still be sure that the structure tensor is the same as the high-dimensional image. Thus the structure tensor of J, and J' are identical.

Consider the following jacobian matrices:
$J_M$: original, high-dimensional jacobian
$J_N$: low-dimensional jacobian in putative colour image
$J_{N,D}$: low-dimensional jacobian formed by putting the strength and direction of $J_M$ into $J_N$ (section 3.1)
$J_{N,LS}$: low-dimensional jacobian formed by the least-squares approach (section 3.2).

we can be absolutely sure of the following fact: the structure tensor formed by $J_M$, $J_{N,D}$ and $J_{N,LS}$ will be identical. Furthermore, if we expand their singular value decompositions:

$$J = V\sqrt{\Lambda}O$$

$$J_M = V_M\sqrt{\Lambda_M}O_M$$

$$J_{N,D} = V_{N,D}\sqrt{\Lambda_{N,D}}O_{N,D}$$

$$J_{N,LS} = V_{N,LS}\sqrt{\Lambda_{N,LS}}O_{N,LS}$$

We know that $V_M = V_{N,D} = V_{N,LS}$, and that $\sqrt{\Lambda_M} = \sqrt{\Lambda_{N,D}} = \sqrt{\Lambda_{N,LS}}$| Thus the three jacobian matrices only differ based upon their 0 matrix, which is an orthonormal matrix.

Therefore, in section 3.1 we explicitly swapped the components of the singular value decomposition, whereas in section 3.2 we take a more direct approach, but the result is the same—the singular value decomposition of the jacobian is only changed with respect to the orthonormal matrix 0. In other words, in both cases the edge component of the gradient representation of the high dimensional image is combined with the spectral component of the gradient representation of the low dimensional (e.g. putative colour) image.

The starting point of methods according to embodiments of the present invention is to approximate gradients in each colour channel, hence building up the matrix J in both the high-dimensional and low-dimensional images. To do this we use a local differencing approximation. Thus for channel fi, at a pixel $$(x, y), \left.\frac{\partial f_i}{\partial x}\right|_{(x,y)} \approx f_i[x-1, y] - f_i[x, y]$$

$$\text{and similarly } \left.\frac{\partial f_i}{\partial y}\right|_{(x,y)} \approx f_i[x, y-1] - f_i[x, y].$$

Given $J_M$ for the high-dimensional image we compute directly the structure tensor at each pixel.

For the low-dimensional image we need to compute a full singular value decomposition of $J_N$ at each pixel in order to find $O_N$ 4.1 Computing the Singular Value Decomposition at Each Pixel From a computational viewpoint it may seem prohibitive to compute an SVD at each pixel. However, the process can be greatly simplified by taking advantage of certain properties of the SVD. Firstly, given J it is straightforward to compute the structure tensor $J J^T$. Secondly, since the structure tensor is a 2×2 matrix, there is a direct analytic solution for the eigenvalues and eigenvectors that make up V and Λ respectively. Having two parts of the decomposition we now compute O by rearranging as in the equation below. Remembering that the SVD of J=V Λ O and that V is orthonormal, gives:

$$O^T = J^T V(\sqrt{\Lambda})^{-1} \quad (16)$$

This decomposition is commonly used to find the Moore-Penrose pseudo-inverse of a matrix, and suffers from well-known instability when the eigenvalues (in particular the smaller eigenvalue) approach zero. To circumvent this we apply a standard approach of adding a small regularization constant to the eigenvalues [12] prior to inverting the matrix $\sqrt{\Lambda}$.

4.2 Gradients at Metamer-Boundaries

Complications can also arise in the substitution of one gradient field for another when there is a zero, or very small gradient, in the low-dimensional image, and a non-zero gradient in the high dimensional image; this could happen, for example, if two metameric spectra are adjacent to each other in a multispectral image, thus both would project to the same colour and there would be zero gradient in the low-dimensional image $I_N$, but there would be a positive gradient in the high-dimensional image $I_M$. In these cases it is not possible to define the matrix $O_N$; to circumvent this we choose a default colour direction (the luminance direction) as the rows for $O_N$ although this choice is entirely arbitrary.

4.3 Gamut Mapping

Preferred embodiments seek to reproduce the magnitude and direction of contrast from a high-dimensional image in a low-dimensional version, such that the colours are approximately correct. Maintaining the absolute contrast, however, is generally not possible after reducing the number of dimensions. For example, consider a black-white boundary captured by a three-channel imaging system: i.e. a gradient from the image-vector [0, 0, 0] to the vector [1, 1, 1]. Using the vector-difference as contrast gives a value of $\sqrt{3}$.

However, if we wish to replicate this in a 2D image, even if the sign and direction of the boundary are well defined, the maximal displayable contrast is only $\sqrt{2}$ (assuming output values on the range [0, 1]).

This problem only becomes apparent in the algorithm after the N channels have been reintegrated (there are no constraints imposed up until this point). Thus the problem is one of gamut-mapping the output of the algorithm onto the displayable gamut of the target imaging device/colour space.

It is possible to deal with this by noting that we can scale the contrast by the maximum displayable contrast to make all the contrasts relative to the maximum; thus in some embodiments we multiply all the contrasts by $$\frac{\sqrt{2}}{\sqrt{3}}.$$

This approach may be unnecessarily restrictive in cases where the contrast is displayable (such as cases where the high-dimensional image has a low overall contrast), but it is the approach that we take here. We also add that the reintegration of each channel separately results in three undefined constants of integration, which can be set by matching the mean value of each channel of the low-dimensional original to the mean value, in each channel, of the output images.

Further modifications include that local averaging can be performed before carrying out the decomposition described above.

The method can be applied to image components indexed by scale

A simple scale-space decomposition involves blurring the image with a Gaussian of progressively greater standard derivation. As the blur becomes larger, only large edge-information is present in the image gradient.

A method according to embodiments of the present invention can be applied on 1 or many scales.

Linear or non-linear scale space decompositions can be used.

According to embodiments of the present invention, from the gradient fields of an image 1 ($U_1 D_1 V_1$) and an image 2 ($U_2 D_2 V_2$) we can create a new gradient field $A = U_1 D_2 V_2$ (colour 1 edge 2) [A is an n×2 matrix where each row is the x- and y-derivative per colour channel i:

$$\frac{dz_i}{dx} \text{ and } \frac{dz_i}{dy}.$$

Rather than reintegrating we could calculate the Laplacian at each pixel by differentiating again:

$$L_i = \frac{d^2 z_i}{dx^2} + \frac{d^2 z_i}{dy^2}.$$

If $I_i(x, y)$ is the ith channel pixel value at (x,y) of an image then we can impose the contrast of image 2 by calculating: $I_i(x,y) = I_i(x,y) + \text{fraction.} * Li$. We can effectively 'sharpen' image 1 with the edge information from image 2.

We can copy contrast across images at any given scale

5 Results

In this section we investigate different applications where it is desirable to both preserve the colour content of the original image, and also to preserve the contrast of the high-dimensional image.

Figure 15:
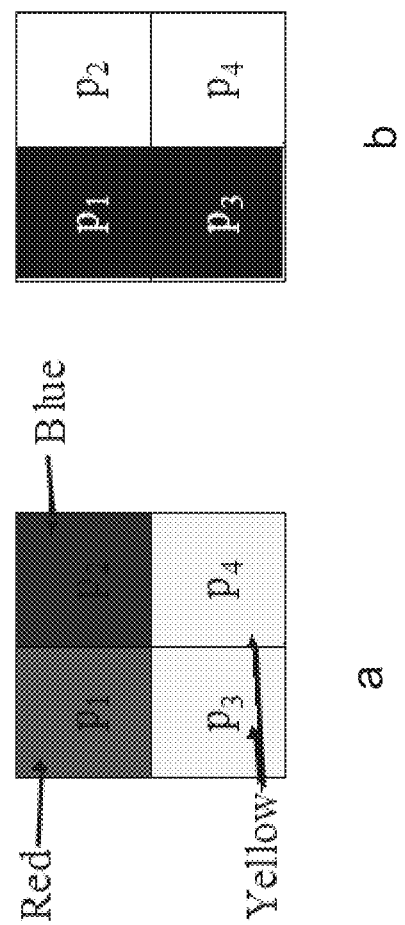

To get a better idea of the method, an example is presented from the problem of converting a 4 channel image to a 3 channel accented colour image. FIG. 15 shows a simple 4 pixel, 4 channel, image in two parts: one forms a colour image, which has a 3-element RGB vector $\rho_N$ at each pixel; and the other represents a fourth channel, characterized by a scalar value $\rho_I$ at each pixel (i.e. black and white) which could, for example, represent an image captured in the Near infra-red part of the electro-magnetic spectrum. The 4 channel image has a 4-element vector $\rho_M$ at each pixel, the first 3 elements of which are $\rho_N$ and the fourth element of which is $\rho_I$. This is defined as the first image (the high dimensional image). The colour image is defined as the second image (the low-dimensional target image).

$\rho_N(\text{pixel}) = \text{Colour} = [RGB]$ $\rho_N(p_1) = \text{Red} = [1\ 0\ 0]$ $\rho_N(p2) = \text{Blue} = [0\ 0\ 1]$ $\rho_N(p3) = \rho_N(p4) = \text{Yellow} = [1\ 1\ 0]$ $\rho_I(p_1) = \rho_I(p3) = 0$ $\rho_I(p2) = \rho_I(p4) = 1$ $\rho_M(p_1) = [1\ 0\ 0\ 0]$ $\rho_M(p2) = [0\ 0\ 1\ 1]$ $\rho_M(p_3) = [1\ 1\ 0\ 0]$ $\mu_M(p_4) = [1\ 1\ 0\ 1]$ In the first step of the method the Jacobian matrix $J_N$ of the second image $p_N$ is calculated, as is the Jacobian matrix $J_M$ of the first image $\rho_M$. This, in turn, is done by firstly calculating the gradient at each pixel, in each channel. One way to do this is to approximate by using differences between adjacent pixels: i.e. the x-gradient $\Delta x$ at $p_1$ is given by $\rho(p_2) - \rho(p_1)$, and the y gradient $\Delta y$ is given by $\rho(p_3) - \rho(p_1)$ $\Delta x(p_1) = \rho(p_2) - \rho(p_1) = [-1\ 0\ 1\ 1]$ $\Delta y(p_1) = \rho(p_3) - \rho(p_1) = [0\ 1\ 0\ 0]$ The high dimensional Jacobian matrix $J_M$ (for the first image) is then:

$$J_M(p_1) = [\ \Delta x(p_1)\ \ \Delta y(p_1)\ ]$$

$$J_M(p_1) = \begin{bmatrix} -1 & 0 & 1 & 1 \\ 0 & 1 & 0 & 0 \end{bmatrix}$$

For the second image $\rho_N$, the Jacobian matrix $J_N$ is given by the first three columns of $J_M$:

$$J_N(p_1) = \begin{bmatrix} -1 & 0 & 1 \\ 0 & 1 & 0 \end{bmatrix}$$

The Jacobian matrix provides a gradient representation of the respective image. The next step is decompose the second image into a gradient representation which comprises spectral and edge components by calculating the singular value decomposition of the Jacobian matrix. The singular value decomposition is a 3 matrix decomposition:

$$J_N = V_N \sqrt{\Lambda_N} O_N$$

where T denotes the transpose operator. In this equation the columns of $O_N$ are the eigenvectors of $J_N J_N^T$, the columns of V are the eigenvectors of $J_N J_N^T$ and the iith entry of the diagonal matrix $\Lambda_N$ are the ith eigenvalue of both $J_N J_N^T$ and $J_N J_N^T$ (these two matrices share the same eigenvalues). $V_N \sqrt{\Lambda_N}$ gives the edge components of the gradient representation and $O_N$ gives the spectral components of the gradient representation.

To compute $V_N$, First $J_N J_N^T$ is calculated:

$$Z_N(p_1) = J_N J_N^T = \begin{bmatrix} 2 & 0 \\ 0 & 1 \end{bmatrix}$$

To find the eigenvectors of $Z_N$ means finding v and $\lambda$ that solve the following equation.

$$Z_N v = \lambda v$$

In this case it is clear that the first and second eigenvectors, $v_1$ and $v_2$, are $[1\ 0]^T$ and $[0\ 1]^T$ respectively, and the associated eigenvalues, $\lambda_1$ and $\lambda_2$, are 2 and 1 respectively. It is to be noted here that both $[1\ 0]^T$ and $[-1\ 0]^T$ are equally valid as first eigenvectors. Given that:

$$V_N = [\ v_1 \ \ v_2\ ] = \begin{bmatrix} 1 & 0 \\ 0 & 1 \end{bmatrix}$$

$$\text{and } \sqrt{\Lambda_N} = \begin{bmatrix} \sqrt{\lambda_1} & 0 \\ 0 & \sqrt{\lambda_2} \end{bmatrix} = \begin{bmatrix} \sqrt{2} & 0 \\ 0 & 1 \end{bmatrix}$$

The columns of $V_N$ are orthonormal, so $V_N^T V_N$=the identity matrix. The following set of equations show how this can be used to solve for $O_N$:

$$J_N = V_N \sqrt{\Lambda_N} O_N$$

$$\Rightarrow V_N^T J_N = \sqrt{\Lambda_N} O_N$$

$$\Rightarrow (\sqrt{\Lambda_N})^{-1} V_N^T J_N = O_N$$

The inverse matrix $(\sqrt{\Lambda_N})^{-1}$ is written as:

$$(\sqrt{\Lambda_N})^{-1} = \begin{bmatrix} 1/\sqrt{\lambda_1} & 0 \\ 0 & 1/\sqrt{\lambda_2} \end{bmatrix} = \begin{bmatrix} 1/\sqrt{2} & 0 \\ 0 & 1 \end{bmatrix}$$

The calculations thus far lead to all the information required to solve for $O_N$:

$$O_N = \begin{bmatrix} 1/\sqrt{2} & 0 \\ 0 & 1 \end{bmatrix} \begin{bmatrix} 1 & 0 \\ 0 & 1 \end{bmatrix} \begin{bmatrix} -1 & 0 & 1 \\ 0 & 1 & 0 \end{bmatrix} = \begin{bmatrix} -1/\sqrt{2} & 0 & 1/\sqrt{2} \\ 0 & 1 & 0 \end{bmatrix}$$

The next step in the method is to decompose the first image into a gradient representation which comprises spectral and edge components by calculating the structure tensor, $J_M J_M^T$ the 4-channel image.

$$Z_M(p_1) = J_M J_M^T = \begin{bmatrix} 3 & 0 \\ 0 & 1 \end{bmatrix}$$

The first and second eigenvectors of this matrix can again be written down as $[1\ 0]^T$ and $[0\ 1]^T$, and the corresponding eigenvalues as 3 and 1 respectively. Now the $\Lambda_M$ and $V_M$ matrices are calculated from the singular value decomposition, $J_M = V_M \sqrt{\Lambda_M} O_M$, which gives $$V_M = \begin{bmatrix} 1 & 0 \\ 0 & 1 \end{bmatrix} \text{ and } \sqrt{\Lambda_M} = \begin{bmatrix} \sqrt{3} & 0 \\ 0 & 1 \end{bmatrix}$$

In a simple embodiment of the method, the edge components from the first image in the form of matrices $\Lambda_M$ and $V_M$ are combined with the spectral components from the second image by using $\Lambda_M$ and $V_M$ to replace $\Lambda_N$ and $V_N$ in the singular value decomposition of $J_N$, to give a new matrix giving a combined gradient representation:

$$J_N^{NEW} = V_M \sqrt{\Lambda_M} O_N$$

$$J_N^{NEW} = \begin{bmatrix} 1 & 0 \\ 0 & 1 \end{bmatrix} \begin{bmatrix} \sqrt{3} & 0 \\ 0 & 1 \end{bmatrix} \begin{bmatrix} -1/\sqrt{2} & 0 & 1/\sqrt{2} \\ 0 & 1 & 0 \end{bmatrix} =$$

$$\begin{bmatrix} -\sqrt{3}/\sqrt{2} & 0 & \sqrt{3}/\sqrt{2} \\ 0 & 1 & 0 \end{bmatrix}$$

In the preferred embodiment of the method (see section 3.2) an alternative calculation is used to generate the new Jacobian matrix from $J_N$, $Z_M$ and $Z_N$; however, for this example (and this pixel) the result is unchanged.

This completes the calculation for a single pixel. This calculation is repeated for all the pixels in each image. The result, for this 2×2 pixel image, is accented image data in the form of 4 Jacobian matrices giving a gradient representation of the accented image. Each row of the Jacobian matrix (of which there are three in this example) represents a gradient field. To form the accented RGB image, each of these three gradient fields is reintegrated, using one from a family of possible methods.

5.1 Visualisation for Dichromats

In the first application we look at the problem of creating images for viewing by dichromats: colour deficient observers with just two cone-types. When dichromats view a scene, rather than seeing a 3D colour representation they see only two dimensions. Thus when a pair of colours differ in the dimension that the dichromat cannot see, they will appear identical.

Previous work on the visualisation of images for colour-blind observers has been done with the goal of generating images so that trichromatic observers can experience the same image as dichromats. The idea in that case is to produce an image that is two-dimensional, but that is indistinguishable from the full-colour original to a particular type of dichromatic observer—the 2D nature of the image means that an ordinary trichromatic observer will lose the same discriminatory power as the dichromat.

In embodiments of the present invention, however, we are interested in generating images in lower dimensions such that they contain the same contrast information as the high-dimensional version, i.e., we mean to generate an image for dichromats that maintains as high as possible fidelity of sensory experience with the original RGB image. A similar approach is taken by Rasche et al. [13], among others, who seek a 2D projection of the original 3D image data such that differences between colours are maximised for the colour-deficient observer. Rather than take the global approach of Rasche et al. [13] preferred embodiments of the inventive use a local contrast measure.

To apply the method described above to this particular problem, we initially simulate the 2D version of a colour image using a standard technique, such as that of Brettel et al. [14, 15] We then apply the contrast field of the full-colour image to the colour gradients of the 2D image to generate a new 2D image with colour separation provided by the full-colour image.

FIG. 3 shows the results for an image of berries taken from the work of Rasche [13]. Here the first image (FIG. 3a) shows the colour original, the second (FIG. 3b) shows the image as it would be viewed by a deuteranope, and the third (FIG. 3c) shows a new image resulting from a method according to an embodiment of the invention. In this example there is a strong red-green contrast which is greatly reduced when viewed by a deuteranope (who are missing the middle-wavelength cone). Using a method according to an embodiment of the invention the red-green contrasts are projected into blue-yellow contrasts and the berries consequently stand out considerably more from the background. FIG. 4 shows a similar example where the preferred method brings out a much better transformation of the red-green contrasts for the deuteranopic observer.

FIG. 5 shows a striking example where the blue-green island-boundary in the original image is invisible to a tritanope (who is missing the blue cone). The result of a method according to an embodiment of the invention is to separate the two colours in the red-green direction.

FIG. 6a shows an original colour image. FIG. 6b shows simulation of FIG. 6a as seen by a colour-blind observer, and FIG. 6c shows the result of a method according to an embodiment of the invention.

We note here that the contrast calculations are purely local; thus two colours that are confused by a colour deficient observer but are not spatially contiguous may not be separated by this algorithm. In such cases a global algorithm, such as that of Rasche et al. [13], is likely to produce good results.

5.2 Visualising NIR Images

When visualising NIR images one has both a 3-channel colour original, and a 4th image that is captured in the Near-Infra-Red (NIR). To apply a method according to an embodiment of the invention to this problem we construct a 4-D colour/NIR image by appending the NIR channel to the existing colour image (assuming that the two images are properly registered). As part of this 4-D image we already have the original colour image, which is a natural choice as the 3-D low-dimensional image.

As there are three colour channels, and only one infra-red channel, the gradient information in the 4-D image will tend to be dominated by the colour gradients. Thus, in preferred embodiments, we balance the colour and infra red gradients so that they contribute equally to the high-dimensional gradients—this helps to accentuate the results, but is not a key component of the algorithm.

The performance of the algorithm in this domain is closely linked to the goal that one wishes to achieve. For example, Fredembach and Susstrunk use the NIR channel to enhance the visual quality of images by removing the effects of haze on the colour original. They do this by fusing the NIR channel with the luminance channel of the colour image, and leaving the colour component of the image untouched. Aspects of the present invention are more concerned with visualising the contrast in the high-dimensional image, with aesthetic improvements being secondary.

FIGS. 7 to 8 show images taken from the work of Fredembach and Susstrunk [17]. In each, the original colour image is shown on the left, the infra-red image in the centre, and on the right is the result of the proposed algorithm. Some of these images have been cropped from the originals to minimise mis-registration problems. In FIG. 7 the original shows an image of a bay with distant mountains that are hidden by haze. These mountains are strongly present in the infra-red image, and the preferred method brings these distant features out well, while maintaining the general feel of the image.

FIG. 8 shows a similar pattern, with the cloud details from the infra-red image being combined with the bluish hue of the distant mountains. In this figure we also display a fourth image that shows a reverse application of a method according to an embodiment of the invention: in this case the contrast of just the infra-red image (a 1D image) is applied to the colour gradients of the colour original (a 3-D image), thus visualising the contrast of the infra-red image using more true-to-life colouring.

5.3 Visualising Multispectral Images

In a further application we look at the visualisation of multispectral images: 31 channel images that have been captured on the range 400-700 nm at 10 nm intervals, and where the value at each pixel represents the underlying reflectance of the corresponding surface.

To create a low-dimensional image we imagine the surfaces to be illuminated by standard illuminant D65 and, using the sRGB colour matching functions (http://www.w3.org/graphics/color/SRGB.html), generate a linear RGB image from the standard image formation equations. As before, we then compute the structure tensor of the full 31 dimensional image, and apply this to the colour-gradients of the RGB image that we have just computed.

The results of this approach can be seen in FIGS. 9 to 12. On the left of these figures is the synthetic RGB image, and on the right is contrast preserving method.

In FIG. 9 we show two different images that look very similar. We need to stress here that the image generated by a method according to an embodiment of the invention is a false-coloured image that reflects the gradient from the all 31 dimensions of the original image. However, in the case of multispectral images, it is well known that the underlying reflectance functions are often smooth and thus much of the high-dimensional contrast is captured in the 3D colour original.

FIG. 10 shows that this is not always the case. In this image the flowers reflect a lot of NIR light, which makes them contrast strongly with the background in the longer-wavelength channels where the eye is not very sensitive. A method according to an embodiment of the invention enhances this contrast by feeding in this contrast to the colour image. FIG. 11 shows this effect in more detail.

Figure 12:
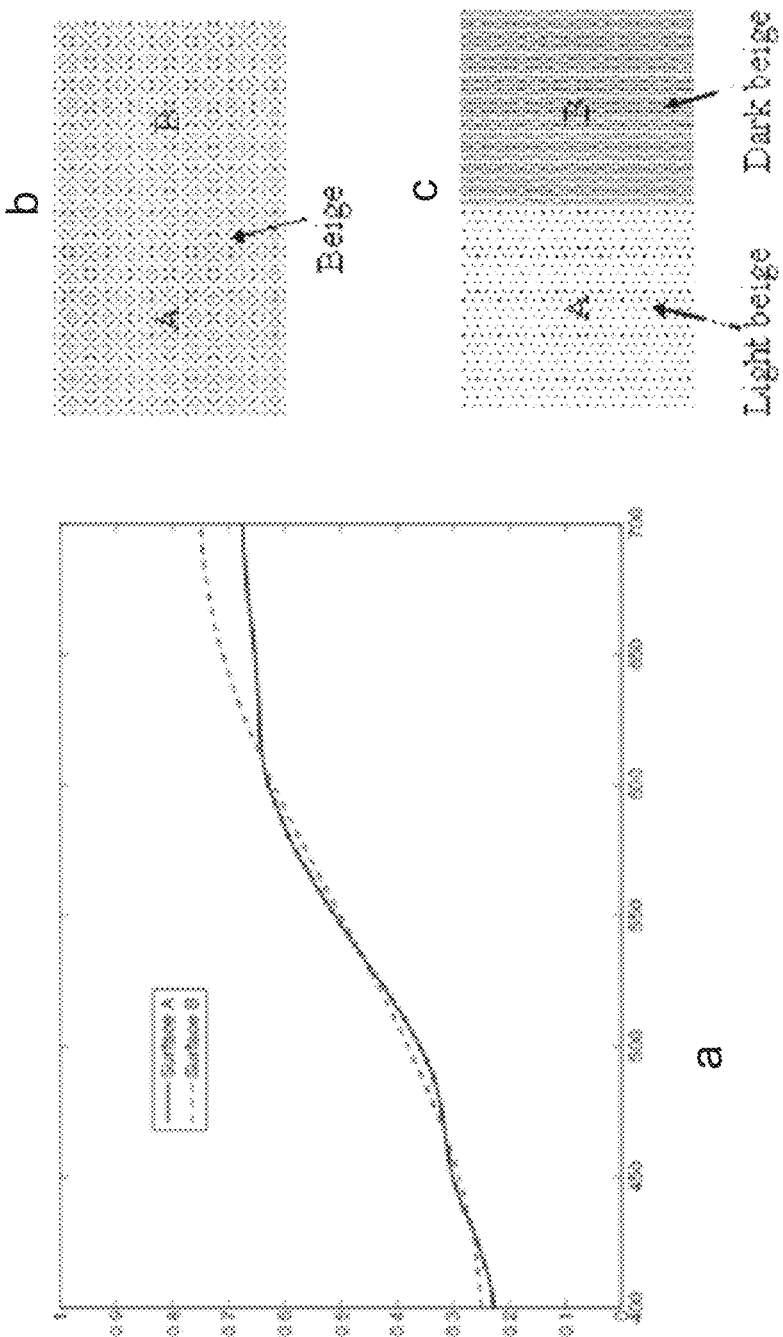

A more striking example can be seen for metameric surfaces—where a pair of surfaces have the same RGB under a given illumination, but different reflectance spectra. In FIG. 12 we show a synthetic example where we have generated two surfaces that are metameric to the CIE standard observer under D65. The reflectance spectra of the two surfaces are shown on the left, in the middle is the sRGB visualisation, which shows no distinction between the surfaces, and on the right is the image generated by a method according to an embodiment of the invention. The new image correctly disambiguates the two surfaces, while maintaining a similar colour to the original surfaces.

5.4 Visualising Hyperspectral Images

In addition to multispectral images, where the images are captured within the visible spectrum, methods according to embodiments of the present invention can also be applied to hyperspectral images, where some (or all) channels are captured outside the visible range. The application of the method is, in many cases, identical to that for multispectral images; the only difference may occur when all the images are captured outside the visible range, and there is therefore no true-colour rendering available. In this case, as stated previously, we can simply generate a putative false-colour visualisation of the starting image and then apply the contrast from the original image to this.

In FIG. 13 we show an image captured by the AVIRIS imaging sensor (http://aviris.jpl.nasa.gov/). The AVIRIS sensor captures 224 separate images, spanning the ultra-violet, visible, and infra-red spectral ranges. Since the image spans the visible spectrum, it is possible to generate a true-colour rendering of the scene—this is shown in FIG. 13a. Other methods can also be applied to visualise the image; FIG. [13c] shows an approach where the data are firstly reduced to three dimensions using principal components analysis, and these three dimensions are mapped to orthogonal colour coordinates [5], while FIG. [13b] shows an alternative method that maps the channels direct to RGB by assuming the range 400 to 2500 nm is actually the visible range 400 to 700 nm [2].

Visualisation of the result of a method according to an embodiment of the invention is shown in FIG. 13d. Here we use the true-colour image as our putative greyscale, and map the contrast from the higher dimensions onto it directly. The new image has the same approximate colours as the true-colour version while it also brings out details, such as the lakes, that are more visible in the false-colour renderings.

5.5 Scientific Visualisation

Preferred embodiments of the method can be applied, not just to images captured by imaging sensors, but also to more general scientific visualisation problems. In FIG. 14(a), we show a brain image generated from 6-D diffusion tensor data. In the first instance, we generate a standard false-colour image by forming the set of principal components of the data and assigning loadings on these to R,G,B (see [16]). Since the first component is much larger than the others, we normalize each colour channel to maximum 1.0. Applying a method according to an embodiment of the invention to this image, we utilize the contrast information in all six channels, with the result shown in FIG. 14(b). Clearly, much more detail is now displayed in the image.

6 Discussion

In some applications we use a realistic colour-representation of the original scene as a starting point for a method according to an embodiment of the invention. While this is available in many of the applications described herein, there may be many other applications where this is not possible; e.g. where spectral bands of the high-dimensional image are entirely outside the visible range. In this instance it would be possible to initially generate a false-coloured image based upon some alternative, e.g. a projection-based approach or with a non-visible band substituted for a visible one, and then to impose the high-dimensional gradient field on this false coloured image. This would again generate a false-coloured image, with a local contrast closer to that of the high-dimensional image.

An advantage of the preferred approach set out here is that it is conceptually simple, and is relatively straight-forward to apply. It is based upon a sound definition of contrast, and can be applied to a wide range of possible applications.

The drawbacks are primarily in the implementation. The method produces three vector fields that need to be reintegrated. These vector fields will often be non-integrable. While many non-integrable fields can be reintegrated in the least-squares sense to produce artefact free greyscale images, there is a potential for visual artefacts to occur. When the three channels are reintegrated separately, there is potential for different artefacts to occur in different channels, although these can be mitigated by finding an appropriate sign-assignment strategy.

A preferred method of reintegration is described in British patent application number 0914603.6, filed on 20 Aug. 2009, continued as international patent application under agents reference N26195 filed on 20 Aug. 2010 (these references being incorporated by reference herein).

Section 7

Preferred embodiments provide a method for visualising high-dimensional data via low-dimensional images. An advantage of the method is that it keeps the approximate colours, as would be seen by a human observer situated at the scene, while retaining the contrast of the high-dimensional scene. To do this we take advantage of a powerful decomposition of the image gradients, which allows us to substitute the magnitude and direction of a high-dimensional gradient field into the colour-direction of a low-dimensional image.

The disclosures in United Kingdom patent application no. 0914982.4, from which this application claims priority, and in the abstract accompanying this application are incorporated herein by reference.

REFERENCES

[1] D. A. Socolinsky and L. B. Wolff, "Multispectral image visualization through first-order fusion.," IEEE Transactions on Image Processing 11(8), pp. 923-931, 2002.

[2] N. Jacobson, M. Gupta and J. Cole, "Linear fusion of image sets for display," IEEE Trans. On Geosciences and Remote Sensing 45, pp. 3277-3288, 2007.

[3] J. Tyo, A. Konsolakis, D. Diersen, and R. Olsen, "Principal-components-based display strategy for spectral imagery," IEEE Trans. on Geosciences and Remote Sensing 41(3), pp. 708-718, 2003.

[4] D. Socolinsky and L. Wolff, "A new visualization paradigm for multispectral imagery and data fusion," in CVPR, pp. 1:319-324, 1999.

[5] D. Socolinsky and L. Wolff, "Multispectral image visualization through first-order fusion," IEEE Trans. Im. Proc. 11, pp. 923-931, 2002.

[6] M. Drew and G. Finlayson, "Realistic colorization via the structure tensor," in Int. Conf. on ImageProcessing: ICIP08, (San Diego, Calif.), 2008.

[7] S. Di Zenzo, "A note on the gradient of a multi-image," Computer Vision, Graphics, and ImageProcessing 33, pp. 116-125, January 1986.

[8] G. Sapiro and D. Ringach, "Anisotropic diffusion of multivalued images with applications to color filtering," IEEE Trans. Im. Proc. 15, pp. 1582-1586, 1996.

[9] R. T. Frankot and R. Chellappa, "A method for enforcing integrability in shape from shading algorithms," IEEE Transactions on Pattern Analysis and Machine Intelligence 10, pp. 439-451, 1988.

[10] A. Agrawal, R. Chellappa, and R. Raskar, "An algebraic approach to surface reconstruction from gradient fields," in Int. Conf. on Computer Vision, pp. I: 174-181, 2005.

[11] G. Golub and C. van Loan, Matrix Computations, John Hopkins U. Press, 1983.

[12] A. Tikhonov and V. Arsenin, Solutions of ill-posed problems, Wiley, 1977.

[13] K. Rasche, R. Geist, and J. Westall, "Detail preserving reproduction of color images for monochro-mats and dichromats.," IEEE Computer Graphics and Applications 25, pp. 22-30, May 2005.

[14] H. Brettel, F. Vi'enot, and J. Mollon, "Computerized simulation of color appearance for dichromats," J. Opt. Soc. Am. A 14, pp. 2647-2655, 1997.

[15] F. Vi'enot, H. Brettel, and J. Mollon, "Digital video colourmaps for checking the legibility of displays by dichromats," Color Research and Application 24, pp. 243-252, 1999.

[16] M. Drew and G. Hamarneh, "Visualizing diffusion tensor dissimilarity using an ica based perceptual color metric," in 15th Color Imaging Conference: Color, Science, Systems and Applications, Society for Imaging Science & Technology (IS&T)/Society for Information Display (SID) joint conference, 2007.

[17] C. Fredembach and S. Süsstrunk, "Colouring the near infrared", Proceedings of the IS&T/SID 16th Color Imaging Conference, pp. 176-182, 2008.

The invention claimed is:

1. A computer implemented method of producing accented image data for an accented image including the steps of:

a) decomposing, using at least one computer processing device, each of a first and a second image into a gradient representation which comprises spectral and edge components;
b) combining, using at least one computer processing device, the edge component from the first image with the spectral component from the second image to form a combined gradient representation; and
c) generating, using at least one computer processing device, accented image data for the accented image from data including the combined gradient representation.

2. The computer implemented method of claim 1, wherein the step of forming the combined gradient representation includes using a gradient tensor that equals a gradient tensor of the first image.

3. The computer implemented method of claim 2, wherein the step of generating the accented image data includes forming a gradient representation of the accented image comprising applying a linear transform to the combined gradient representation.

4. The computer implemented method of claim 3, wherein the step of applying the linear transform includes adjusting the combined gradient representation to make its spectral components closer to the spectral components of the second image while keeping the gradient tensor of the combined gradient representation equal to the gradient tensor of the first image.

5. The computer implemented method of claim 1, wherein the accented image data includes a gradient representation of the accented image, the method further comprising the step of:
d) forming, using at least one computer processing device, the accented image by calculating an integral or an approximation to the integral of the gradient representation of the accented image.

6. The computer implemented method of claim 1, wherein the accented image data includes the accented image, wherein step c) includes using at least one computer processing device to generate accented image data from the combined gradient representation and one or more of the first and second images.

7. The method according of claim 6, wherein the step of generating accented image data includes using at least one computer processing device to add a fraction of the divergence of the combined gradient representation to one or more of the first and second images.

8. The computer implemented method of claim 1, wherein the first image comprises more spectral dimensions than the second image.

9. The method of claim 1, wherein the step of decomposing includes deriving, using at least one computer processing device, the spectral and edge components of the derivatives using singular value decomposition.

10. The computer implemented method of claim 1, wherein the second image is derived from the first image.

11. An image generation system comprising:
a first processing unit arranged to decompose a first image into a gradient representation comprising spectral components and edge components;
a second processing unit arranged to decompose a second image into a gradient representation comprising spectral components and edge components; and
a third processing unit arranged to combine edge components of the first image and the spectral components of the second image to form a combined gradient representation and to generate accented image data from data including the combined gradient representation.

12. The image generation system of claim 11, further comprising an image generation component arranged to generate the accented image from the accented image data.

13. The image generation system of claim 12, wherein the image generation component is connectable to a printing system having one or more controllable printing characteristics, wherein the image generation system is arranged to generate the accented image for output by the printing system in dependence on the one or more controllable printing characteristics.

14. The image generation system of claim 13, wherein the printing characteristics include data on availability of inks in said printing system, the image generation system being arranged to derive the second image from the first image in dependence upon said availability of inks.

15. The image generation system of claim 11, further comprising an image capture device arranged to capture the first image.

16. The image generation system of claim 11, further comprising an image divider arranged to derive the second image from at least components of the first image.

17. The image generation system of claim 11, further comprising a feature processing unit configured to automatically detect features of interest in the accented image based on increased contrast in the accented image data.

18. The image generation system of claim 15, wherein the image capture device is arranged to capture a plurality of images from different modalities and to combine the plurality of images into the first image.

19. The image generation system of claim 18, wherein the different modalities include at least two of the visible spectrum, near infra-red, ultrasound, infra-red, x-ray, magnetic resonance imaging (MRI), and positron emission tomography (PET).

20. A non-transitory computer readable medium encoded with a computer program, wherein execution of the computer program by a computer causes the computer to perform a method comprising:
a) decomposing, using the computer, each of a first and a second image into a gradient representation which comprises spectral and edge components;
b) combining, using the computer, the edge component from the first image with the spectral component from the second image to form a combined gradient representation;
c) generating, using the computer, accented image data for the accented image from data including the combined gradient representation; and
d) produce the accented image from the accented image data and output the accented image for display on a display associated with the computer.

* * * * *